US008319102B2

(12) United States Patent
Grein et al.

(10) Patent No.: US 8,319,102 B2
(45) Date of Patent: Nov. 27, 2012

(54) LAYER FOR CABLES HAVING IMPROVED STRESS WHITENING RESISTANCE

(75) Inventors: Christelle Grein, Linz (AT); Magnus Palmlof, Vastra Frolunda (SE); Markus Gahleitner, Neuhofen a.d. Krems (AT); Bernt-Ake Sultan, Stenungsund (SE); Ulf Torgersen, Ytterby (SE)

(73) Assignee: Borealis Technology Oy, Porvoo (FI)

( * ) Notice: Subject to any disclaimer, the term of this patent is extended or adjusted under 35 U.S.C. 154(b) by 337 days.

(21) Appl. No.: 12/297,288

(22) PCT Filed: Apr. 11, 2007

(86) PCT No.: PCT/EP2007/003225
§ 371 (c)(1),
(2), (4) Date: Sep. 8, 2009

(87) PCT Pub. No.: WO2007/118659
PCT Pub. Date: Oct. 25, 2007

(65) Prior Publication Data
US 2010/0022715 A1  Jan. 28, 2010

(30) Foreign Application Priority Data

Apr. 18, 2006  (EP) .................... 06008010

(51) Int. Cl.
C08L 23/10 (2006.01)
C08L 23/08 (2006.01)
H01B 3/00 (2006.01)

(52) U.S. Cl. ....... 174/110 SR; 174/110 R; 174/110 PM; 525/191; 525/221; 525/222; 525/231; 525/240

(58) Field of Classification Search .................. 525/191, 525/221, 222, 231, 240; 174/110 R, 110 PM, 174/110 SR
See application file for complete search history.

(56) References Cited

U.S. PATENT DOCUMENTS

| | | | |
|---|---|---|---|
| 6,303,866 B1 * | 10/2001 | Lagreve et al. ........... | 174/110 R |
| 6,673,855 B1 | 1/2004 | Braga et al. | |
| 7,619,165 B2 * | 11/2009 | Gahleitner et al. ....... | 174/110 R |
| 2003/0049477 A1 * | 3/2003 | Morizono et al. ............ | 428/516 |
| 2005/0241820 A1 * | 11/2005 | Wasserman et al. .......... | 166/100 |
| 2007/0066758 A1 * | 3/2007 | McArdle et al. ............... | 525/240 |

FOREIGN PATENT DOCUMENTS

| | | |
|---|---|---|
| EP | 0 491 566 | 10/1996 |
| EP | 0 586 390 | 5/1997 |
| EP | 0 874 022 | 10/1998 |
| EP | 0 893 801 | 4/2004 |
| EP | 1 373 403 | 4/2005 |
| EP | 1 619 217 | 1/2006 |
| JP | 2001-236828 | 8/2001 |
| WO | WO98/12234 | 3/1998 |
| WO | WO 03/002652 | 1/2003 |
| WO | WO 2007019088 A1 * | 2/2007 |

OTHER PUBLICATIONS

Gupta, A. K. et al Journal of Applied Polymer Science vol. 45, pp. 1303-1312, published Jul. 1992.*
Jang, B. Z. et al Journal of Applied Polymer Science vol. 30 pp. 2485-2504 published Jun. 1985.*
Machine translation of JP2001236828.*
International Preliminary Report on Patentability for International application No. PCT/EP2007/003225.
International Search Report for International application No. PCT/EP2007/003225.
Written Opinion International Search Report for international application No. PCT/EP2007/003225.

* cited by examiner

Primary Examiner — Irina S Zemel
Assistant Examiner — Jeffrey Lenihan
(74) Attorney, Agent, or Firm — Fay Sharpe LLP

(57) ABSTRACT

The present invention relates to a Insulation layer for cables, a composition and a process thereof, showing improved stress whitening resistance by maintaining good mechanical and electrical properties and being environmental friendly.

13 Claims, No Drawings

LAYER FOR CABLES HAVING IMPROVED STRESS WHITENING RESISTANCE

The present invention relates to an insulation layer for cables showing improved stress whitening resistance by maintaining good mechanical and electrical properties and being environmental friendly. Moreover, the present invention relates to a composition, which can be used for the production of the insulation layer, and to a process for the production of such layer. Furthermore, the invention is also related to a cable comprising the inventive layer.

Nowadays, ethylene polymer products are used as insulation in semi-conducting shields for low, medium and high voltage cables, respectively, due to easy processability and beneficial electrical properties as well as their good behaviour regarding stress whitening resistance.

In addition, in cable application polyvinyl chloride (PVC) is also commonly used as insulation material, usually in combination with softeners to reach the desired softness of cables and having good stress whitening resistance.

A drawback with polyvinyl chloride is the restricted operation temperature of 70° C. by standardization. This has to be seen in relation to the fact that PVC has a restricted mechanical performance at elevated temperatures. In addition, softeners have to be added to PVC in order to maintain a high level of flexibility. Insufficient amounts of softeners reduce low temperature properties of PVC significantly. From an environmental point of view, these softeners are not always regarded as problem-free, making them desirable to eliminate.

Cables comprising polyethylene layers are commonly operated at 70° C. However, there is a need of higher operating temperatures, which then require cross-linking of the polyethylene, otherwise the polyethylene would soften or even melt. Hence, in the cable sector, the coating surrounding of the conductor commonly consists of cross-linked polyethylene materials to give a satisfactory mechanical performance, even under high temperature in continuous use and under conditions of current overload while at the same time maintaining a high level of flexibility.

On the other hand, a disadvantage of these products is that cross-linked products are hard to recycle. Moreover, in some cases, the outer-protective sheet consists of polyvinyl chloride (PVC) which is difficult to separate by conventional methods from the cross-linked polyolefins containing inorganic fillers. When the cable has reached the end of this operational life time, the whole cable has to be disposed and—in case of combustion—highly toxic chlorinated products are generated.

In the case of peroxide curing of the cables, the cross-linking stage itself is a limiting factor in terms of line speed. Moreover, in processing such cables by extrusion, it is important that cross-linking does not occur until the mixture has left the extruder, since premature cross-linking or scorch makes it is impossible to maintain a uniform production capacity, and furthermore the quality of the resulting product will be unsatisfactory. Cross-linking or pre-curing within the extruder causes gelation and adhesion of the polymer gel to surface of the equipment, with consequent risk of plugging.

Therefore, there is a need for new layer compositions which allow a higher operating temperature than polyethylene or PVC materials, preferably an operating temperature of at least 90° C., reduce the scorch phenomenon also allowing a high extrusion speed and show good mechanical properties.

EP 0 893 801 A1 discloses polypropylene polymer components suitable as insulation sheet material. It particularly discloses a composition of crystalline propylene homopolymer or copolymer mixed with a copolymer of ethylene with an alpha-olefin having a low density and a high structural uniformity, in particular having a highly homogeneous distribution of the alpha-olefin between the polymer molecules. However, EP 0 893 801 A1 does not disclose the possibility having an polypropylene layer suitable for high temperature operation conditions, simultaneously having very good mechanical properties.

EP 0 401 7147 provides an environmentally friendly insulation layer allowing an operating temperature of at least 90° C. and simultaneously having enhanced mechanical properties in particular a high impact strength and a good tensile strength.

However, such polypropylene layer exhibits a property known as stress whitening (SW). Hence, when such polymers are bended or impacted, the bending or impact zone turns to an opaque milky colour even if the polymer is coloured. Therefore, mostly, polyethylene is added to the composition in order to improve the stress whitening resistance. The stress whitening resistance even occurs also in pigmented polypropylene compositions. Obviously, stress whitening is a non-desired effect and in a cable application it occurs e.g. during coiling at installation. The lower the temperature, the more pronounce becomes the stress whitening effect. The effect is seen as potential killer variable to any attempts to introduce a polypropylene concept for power cables.

Furthermore, in cable applications cracking of a cable shall not occur when it is coiled or installed at the site. The risk for cracking is more pronounced when coiled or installed at lower temperatures. Using pure heterophasic polypropylene compositions it has been observed that cracking may occur when coiling at a temperature at −20° C. or below.

Therefore, object of the present invention is to provide a layer for cables comprising a polypropylene composition wherein the polypropylene composition shows good mechanical and electrical properties, even though environmental friendly and no or low stress whitening and crack formation at low temperature, and thus the layer can be used as a insulation layer.

The present invention is based on the finding that the above object can be achieved if a polypropylene composition comprises a polar ethylene polymer in an sufficient amount.

Therefore, the present invention provides an insulation layer for cables made of a polypropylene composition comprising a. a polypropylene base resin (A), which comprises a propylene homopolymer, a random propylene copolymer or a heterophasic propylene copolymer consisting of
 i. a propylene homo- and/or copolymer as matrix phase, and
 ii. a propylene copolymer as dispersed phase, and
b. a polar ethylene polymer (B), in amount of 10 to 50 wt %, based on the total polypropylene composition.

Such an insulation layer is not only environmental friendly and can be used at high temperatures, but also shows no or low stress whitening under impact by maintaining good mechanical and electrical properties. Furthermore, cracking of the polypropylene composition can be avoided at low temperatures.

In the present invention the polypropylene base resin (A) preferably comprises the propylene homopolymer, the random propylene copolymer or the heterophasic propylene copolymer in an amount of 50 to 90 wt %, more preferably 55 to 85 wt %, most preferably 60 to 80 wt %.

Furthermore, it is preferred that the polypropylene base resin (A) comprises a random propylene copolymer or heterophasic propylene copolymer, more preferred a heterophasic propylene copolymer.

There are essentially two kinds of heterophasic propylene copolymers known in the art, namely heterophasic copolymers comprising a propylene random copolymer as matrix phase (RAHECO) or heterophasic copolymers having a propylene homopolymer as matrix phase (HECO).

The term "homopolymer" used herein refers to isotactic polypropylene that substantially, i.e. to at least 98 wt.-%, consists of propylene units. Preferably, the homopolymer consists of 99 wt.-%, more preferably of 99.5 wt.-% of propylene units.

However, in the present invention, it is preferred that the matrix phase of the heterophasic propylene copolymer is a propylene copolymer and more preferred a random copolymer.

A random copolymer is a copolymer where the comonomer part is randomly distributed in the polymer chains.

Hence, according to this definition, it is preferred that the random propylene copolymer comprises at least one comonomer selected from the group consisting of ethylene and $C_4$-$C_8$ alpha-olefins. Preferred $C_4$-$C_8$ alpha-olefins are 1-butene, 1-pentene, 4-methyl-1-pentene, 1-hexene, 1-heptene or 1-octene, more preferred 1-butene. The most preferred random propylene copolymer consists of propylene and ethylene.

Furthermore, the comonomer content of the polypropylene matrix preferably is 0.5 to 10 wt %, more preferably 1 to 8 wt % and most preferably 2 to 7 wt %.

For combining optimum processability with the requirement mechanical properties, the incorporation of the comonomer can be controlled in such a way that one part of the polypropylene contains more comonomer than the other. To ensure suitable for the purpose of this patent, this interpolymeric difference in the comonomer content must exceed a level which allows full miscibility of all parts of the polymer. Suitable polypropylenes are described e.g. in WO 03/002652

It is preferred that a polypropylene matrix has a peak melting temperature of at least 135° C., more preferably of at least 140° C.

It is also preferred that the heterophasic propylene copolymer comprises 50 to 90 wt % of the polypropylene matrix, more preferred 55 to 85 wt % and most preferred 60 to 80 wt %, in order to achieve a good balance of the properties in the insulation layer.

Furthermore, the heterophasic propylene composition according to this invention further consists of a propylene copolymer which is dispersed in the polypropylene matrix with in average particle size of less than 1 micrometer. This particle size allows a good practicable distribution in the matrix and influences the impact strength of the insulation layer positively. The particle size of the propylene copolymer can be determined as it is described in EP 0 401 7147.

It is preferred that propylene copolymer is dispersed in the polypropylene matrix in a amount of 10 to 50 wt %, more preferred 15 to 45 wt % and most preferred 20 to 40 wt %.

Optionally, the propylene copolymer may also include crystalline polyethylene, but not more than 10 wt %, more preferably 5 wt % and most preferably 2 wt % of the total propylene copolymer.

Preferably, the propylene copolymer comprises at least one comonomer selected from the group consisting of ethylene and $C_4$-$C_8$ alpha-olefin. Preferred $C_4$-$C_8$ alpha-olefins are 1-butene, 1-pentene, 4-methyl-1-1-pentene, 1-hexene, 1-heptene or 1-octene, more preferred is 1-butene. The most preferred substantially amorphous propylene copolymer is a so-called "ethylene-propylene rubber" (EPR), comprising 30-70 wt % ethylene units and 70-30 wt % propylene units. Optionally, this copolymer can also contain diene units and is then technically denoted as "ethylene-propylene diene rubber" (EPDM). While the EPR can be both produced either directly in one step of the polymerisation of the polypropylene or added as a separate component in a subsequent melt mixing or blending step, the EPDM can also be added in a subsequent melt mixing or blending step.

Preferably, the comonomer content of the propylene copolymer is 20-80 wt %, more preferably 30-70 wt % and most preferred 60-65 wt %.

Furthermore, the heterophasic propylene copolymer has preferably a melt flow rate (measured according to ISO 1133) of 0.5 to 50 g/10 min, more preferred of 0.55 to 20 g/10 min, most preferred 0.5 to 8 g/10 min.

In order to improve the stress whitening resistance by maintaining the good mechanical and electric properties, the polypropylene composition comprises 5 to 50 wt % of a polar ethylene polymer (B). Preferably, the polar ethylene polymer (B) is used in an amount of 15 to 40 wt %, more preferred of 20 to 40 wt %, based on the total polypropylene composition.

The polar ethylene polymer (B) preferably is produced by copolymerisation of ethylene with polar comonomers. However, it may also be produced by grafting the ethylene polymer, for example by grafting acrylic acid, methacrylic acid or maleic anhydride onto the polymer.

It is preferred that the polar groups are introduced into the ethylene polymer by copolymerisation of ethylene with appropriate comonomers bearing polar groups.

It is further preferred that the comonomers are selected from $C_1$- to $C_6$-alkyl acrylates, $C_1$- to $C_6$-alkyl methacrylates, acrylic acids, methacrylic acids and vinyl acetate, more preferred from $C_1$ to $C_4$-alkyl acrylat or vinyl acetate. The copolymer may also contain ionomeric structures (like in e.g. DuPont's Surlyn types).

Furthermore, the comonomer amount in the polar ethylene polymer (B) preferably is between 2 to 40 wt %, more preferably of 2 to 30 wt %, most preferably of 2 to 25 wt %.

As demonstrated below, the polypropylene composition of the present invention preferably shows no crack formation at a temperature of −20° C. or below, more preferably at a temperature of −40° C., in a cold bend test.

Furthermore, the stress whitening intensity of the polypropylene composition preferably is equal to or less than 3, more preferably of equal to or less than 2 at a temperature of −40° C. in a cold bend test.

Moreover, at room temperature, the polypropylene composition of the present invention preferably has a stress whitening intensity of equal to or less than 3, more preferably of equal to or less than 2 in a three-point bending test, by maintaining all other good properties of the polypropylene insulation layer, like flexural and tensile modulus as well as elongation.

Furthermore, it is preferred that the insulation layer of the present invention has preferably a tensile modulus from 100 to 1000 MPa, more preferably from 150 to 800 MPa, most preferably from 150 to 500 MPa. The tensile modulus has been determined according to ISO 527-3.

Additionally it is preferred that the strain at yield is above 20%, more preferred above 22% measured according to ISO 527-3.

The elongation at break of the present insulation layer preferably is 450 to 900%, more preferably 500 to 880%, most preferably 530 to 850% measured by ISO 527-3.

The Charpy impact strength is a destructive test of impact resistance consisting of placing the optionally notched specimen in a horizontal position between two supports and applying a strike of known intensity, which will normally fracture the specimen. The energy uptake (damping) in this fracturing process is recorded as a measure of impact strength. The Charpy impact has been measured according to ISO 179 1 eA (23° C.) and according to ISO 179 1 eA (−20° C.). It is preferred that the value measured at 23° C. for the Charpy impact test is at least 50 kJ/m$^2$, more preferred at least 55 kJ/m$^2$, and most preferred 70 kJ/m$^2$. In addition, preferably the value measured at −20° C. according to ISO 179 1 eA is at least 2 kJ/m$^2$, more preferably at least 5 kJ/m$^2$, and most preferably at least 5.5 kJ/m$^2$.

The melt flow rate (MFR), which is equivalent to the term "melt index" previously used, indicates the flowability and thus processability of a polymer. The higher the melt flow rate, the lower the viscosity of the polymer. The MFR is measured according to ISO 1133. In the present invention the polypropylene composition preferably has an MFR$_2$ (230° C./2.16 kg) of 0.01 to 2.5 g/10 min, more preferably of 0.5 to 2 g/10 min.

Furthermore it is preferred that the polypropylene composition of the inventive layer has a maximal peak melting temperature (T$_m$) of above 135° C., more preferred of above 140° C.

The polypropylene composition of the present invention and its components can be produced by any method known in the art. However, it is preferred that the polypropylene matrix of the heterophasic propylene base resin is produced in one or more slurry reactors and optionally one or more gas phase reactors followed by producing the polypropylene copolymer in the gas phase by blending or in situ polymerisation of ethylene in the reactor system. Afterwards more than 5 wt % and up to 50 wt % of the polar ethylene polymer (B), based on the total polypropylene composition, is mixed by any possible method known in the art into the composition.

The slurry phase polymerisation can be carried out at a temperature of lower than 75° C., preferably 60 to 65° C. and a pressure varying between 60 to 90 bar, preferably 30 to 70 bar. The polymerisation is preferably carried out under such conditions that 20 to 90 wt %, preferably 40 to 80 wt % from the polymers are polymerised in the reactors. The residence time can be between 15 to 20 minutes.

The gas phase polymerisation step is carried out preferably by transferring the reactor mixture from the slurry phase directly to the gas phase without removing unreacted monomers, more preferably by a pressure of higher than 10 bar. The reaction temperature used will generally be within the range of 60 to 115° C., more preferably 70 to 110° C. The reaction pressure will be preferably higher than 5 bar and more preferably be in the range of 10 to 25 bar, and the residence time will be preferably 0.1 to 5 hours.

Preferably a loop reactor is used as said slurry reactor also the reactor type such as a tank reactor could also be employed. According to another embodiment, the slurry phase is carried out in two slurry reactors preferably but not necessarily in two loop reactors. By doing so, the comonomer distribution can easily be controlled. When continuing the copolymerisation in the gas phase reactor or reactors, the comonomer content can be increased further. Thus, the matrix polymer can be tailored by adjusting comonomer ratio in different reactors.

Polymerisation may be achieved by using any standard olefin polymerisation catalysts and these are well-known to the person skilled in the art. Preferably a catalyst system comprises an ordinary sterol-specific Ziegler-Natta catalyst, metallocene catalyst or other organo-metallic or coordination catalysts. The particularly preferred catalyst system is a high yield Ziegler-Natta catalyst, having a catalyst component, a co-catalyst component optionally an external donor. The catalyst system may thus contain a titanium component and an electro-donor component supported on an activated magnesium dichloride, trialkylammonium component as an activator and an electron-donor component. A preferred catalyst system is a metallocene catalyst having a bridge structure giving a high stereo activity and which is an activity complex impregnated on a carrier. Suitable catalyst systems are described in, for example, FI 88047, EP 491566, EP 586390 and WO 98/12234 which are hereby incorporated by reference.

Moreover, the present invention relates to process for producing an insulation layer for a cable wherein a polypropylene composition described above is formed into a layer of said cable.

The present invention also relates to a new cable comprising the above defined layer. For low voltage application, the cable system may further comprises one conductor and one insulation layer, or of one conductor and one insulation layer and an additional jacketing layer, or of one conductor, one semi-conductive layer and one insulation layer. Medium and high-voltage cable system may further comprises one conductor, one inner semi-conductive layer, one insulation layer and one outer semi-conductive layer, optionally covered by an additional jacketing layer.

Furthermore, solid fillers as carbon black can be incorporated into the insulation layer, but also any other additives suitable for such layers.

Moreover, not only the insulation layer but also other layers can comprise the composition as defined above. Hence, also the semiconductive layer and/or jacketing layer may comprise the inventive composition. It is preferred that the composition in the layers is thermoplastic, more preferred that the layers are thermoplastic.

The final cable can also consist of multiple conductors or cores, normally 1, 2, 3 or 4 combined with single and common insulation and sheet layers.

In the present invention the polypropylene composition is extruded on the conductor or conductors following by solidification of the polypropylene composition at line speeds of preferably 3 to 400 m/min, more preferably 50 to 300 m/min, in order to form the Insulation layer for the cable. More preferably, the solidification takes place in a water bath.

Measurement Methods

1. Stress Whitening

In order to evaluate the stress whitening two different methods are used, the so-called cold bend method according to EN 60811-1-4 and the reversed three point bending test.

1.1 Cold Bend Test

In the cold bend test the stress whitening is measured according to EN 60811-1-4. A cable consisting of a 3 mm Al conductor covered by 0.7 mm polymer insulation is coiled around an axis having a diameter of 15 or 19 mm at −40° C. or −20° C. Cable and axis are conditioned at this low temperature prior to coiling. According to the standard a 20 mm axis should be used for size of cable. Hence the test in this case is preformed under tougher conditions than required. The cold bend test ranking is from 0 to 5 where 0 means no stress whitening and 5 means severe stress whitening.

1.2 Three Point Bending Test

The three point bending test is carried out on a universal testing machine (Zwick Z010) at 50 mm/min. The samples are 2 mm thick injection molded UL94 specimens (125× 12.5×2 mm).

The experimental set-up consists of the reversed three point bending test coupled with an optical detection system.

The mechanical set up consists of:
- a fix part, with a span of 40 mm;
- a moving part (bending striker), where (i) a light source has been fixed at the bottom and where (ii) the optical sensor is fixed on a vertical rod.

This set-up guarantees that the distance light source—optical sensor remains constant during the test, prerequisite for a good reproducibility of the measurements.

Three different parameters are determined:
a) bending angle at which stress whitening (SW) occurs [°], SW angle. It is correlated with a sharp drop of the optical response during bending;
b) residual size of the blushing zones immediately after a bending of 90° [measured in mm], called Res-SW 90° C.;
c) residual intensity of the blushing zone immediately after a bending of 90° C. (visual appreciation from 0 to 5, with 0: no remaining blush, 5: intensive whitening), called SW-intensity.

The bending angle of stress whitening is determined as follows:

The force deflection in the optical signal deflection curve are recorded. At the beginning of the test, the optical signal is, whatever, the initial transparency/haziness of the sample, taken to be 100%. Occurrence of white fraction is correlated with a sharp drop in an optical signal deflection curve. The blushing one is evaluated this way:
- setting a tangent at the inflection of the optical signal-deflection curve (not shown);
- cutting of this tangent with a 100% optical signal line in order to provide the deflection at which stress whitening occurs;
- calculating in an automated way, automated the onset-angle for blushing using established correlations between deflection and angle (angle: polynomial function of degree 4 of deflection).

The residual size of a blushing zone after unloading is determined as follows:

Tests are conducted to a deflection corresponding to an angle of 90°. These deflections can be calculated to different sample and test geometry using standard trigonometric formulas.

The specimen is then intensively unloaded (crosshead speed: 400 mm/min). The size of the blushing area is measured immediately after testing using a slide gage. The obtained value is entered manually in a result sheet; averages calculations are automated.

The intensity of the blushing zone after unloading is determined as follows:

Directly after testing, the intensity of the whitening is evaluated. A mark of 0 is attributed when there is no residual blushing; a note of 5 when the whitening of the deformed zone is extremely pronounced. The obtained value is entered manually in a result sheet; average calculations are automated. The determination of these parameters is somewhat subjective and dependent on an operator. The obtained values can therefore not be considered as 100% reproducible values, even they given crucial information on the elastic recovery potential of the material. What is important to notice, is:
a. an intensity of 0 is remarkably
b. an intensity of up to 1 is excellent,
c. an intensity between 1.1 and 1.5 is good;
d. an intensity between 1.6 and 3 is acceptable;
e. an intensity higher than 3 is insufficient.

2. Melt Flow rate

The melt flow rate is determined according to ISO 1133 and it is indicated in g/10 min. The MFR is an indication of the flowability and thus the processability of the polymer. The higher the melt flow rate, the lower the viscosity of the polymer. The MFR of the polypropylene composition is measured with a load of 2.16 kg at 230° C. The MFR of the ethylene polymer is measured with a load of 2.16 kg at 190° C.

3. Tensile Test

Tensile tests were performed according to ISO 527-3 using injection moulded specimen as described in EN ISO 1873-2 (dog bone shape, 3 mm thickness).

Tensile modulus (E-modulus) was also determined according to ISO 527-3 and calculated from the linear part of the tensile test results.

4. Notched Charpy Test

The Charpy impact is measured according to ISO 179 1 eA (23° C.) and according to ISO 179 1 eA (−20° C.).

5. Peak Melting Temperature

The peak melting temperature (Tm) is determined by differential scanning caliometry (DSC) according to ISO 3146.

6. Density

The density is measured according to ISO 1183.

EXAMPLES

The different Polypropylene compositions were extruded on a circular aluminium conductor. The diameter of the conductor was 3 mm and the insulator thickness 0.7 mm. The line was running at a speed of 75 m/min and temperature settings on the line ranging from 178-241° C. resulting in a melt temperature of ca 240 C. Cooling bath had a temperature of 23 C. At line speed of 75 m/min the extrudability of the polypropylene compositions according to the present invention was good and a smooth surfaces were obtained.

Materials:

a.) Polypropylene Base Resin (A):

Two different polypropylene base resins (A) were used in the examples.

Polypropylene base resin A1 is a heterophasic polypropylene copolymer of a polypropylene-random copolymer as matrix phase and an ethylene propylene-rubber as dispersed phase, which has a total $C_2$-content of approx. 15 wt %, total XS (xylene solubles) content of approx. 27 wt % and an MFR (230° C./2.16 kg) of 0.8 g/10 min.

Polypropylene base resin A2 is a heterophasic polypropylene copolymer of a polypropylene-random copolymer as matrix phase and an ethylene-propylene-rubber as dispersed phase, which has a total $C_2$-content approx. of 12 wt %, total XS (xylene solubles) content of approx. 32 wt % and MFR (230° C./2.16 kg) of 1.2 g/10 min.

b.) Polar Ethylene Polymer (B):

Three different polar ethylene polymers (B) were used in the examples:
- an ethylene-methyl acrylate copolymer (EMA) containing 20 wt % of methyl acrylate, which has an MFR (190° C./2.16 kg) of 8 g/10 min, and a density of 942 kg/m³,
- an ethylene-butyl acrylate copolymer (EBA) containing 17 wt % butyl acrylate, which has an MFR (190° C./2.16 kg) of 1.10 g/10 min, and density of 924 kg/m³, or
- an ethylene-vinyl acetate copolymer (EVA) containing 27 wt % vinyl acetate, which has an MFR (190° C./2.16 kg) of 3 g/10 min, and a density of 951 kg/m³.

All properties of the tested compositions are shown in Table 1.

TABLE 1

| Material | MFR$_2$ [g/10 min] | Cold bend test, (−40° C.) Cracks yes/no | Cold bend test, (−40° C.) SW intensity | SW angle [°] | Res SW 90° [mm] | Three point bending test SW intensity | Notch Charpy, RT [kJ/m$^2$] | Notch Charpy, −20° C. [kJ/m$^2$] | T$_m$ [° C.] Peak 1 | T$_m$ [° C.] Peak 2 |
|---|---|---|---|---|---|---|---|---|---|---|
| Example 1 (A1 + 25 wt % EMA) | 1.65 | no | 0 | 48.9 | 0 | 0 | 84.4 | 11.4 | | |
| Example 2 (A1 + 25 wt % EVA) | 1.7 | no | 3 | 40.6 | 0 | 0 | 86.9 | 10.2 | | |
| Example 3 (A2 + 25 wt % EBA) | 1.5 | no | 0 | 70.4 | 0 | 0 | 76.8 | 65.5 | | |
| Example 4 (A1 + 15 wt % EBA) | 0.9 | trans mode | 4 | 32.8 | 0 | 0.5 | 87.7 | 8.3 | | |
| Example 5 (A1 + 25 wt % EBA) | 1.15 | no | 0 | 40 | 0 | 0.5 | 86.9 | 12.4 | | |
| Example 6 (A1 + 30 wt % EBA) | | no | 0 | 53.3 | 0 | 0 | | | 95.1 | 142.2 |
| Example 7 (A1 + 50 wt % EBA) | | no | 0 | 47.5 | 0 | 0 | | | 95.7 | 141.8 |
| Comparative Example 1 (A1) | 0.8 | yes | 5 | 45.5 | 0 | 0 | 91.6 | 8.4 | 111.3 | 142.8 |
| Comparative Example 2 (A2) | 1.2 | no | 4 | 38.5 | 0 | 0 | 83.5 | 5.6 | | 140.5 |
| Comparative Example 3 (A1 + 5 wt % EBA) | 1.1 | no | 4-5 | 33.4 | 0 | 0 | | | | 142.5 |

| Material | Tensile modulus [MPa] | Tensile strength [MPa] | Stress at yield [MPa] | Strain at yield [%] | Stress at break [MPa] | Strain at break [%] |
|---|---|---|---|---|---|---|
| Example 1 (A1 + 25 wt % EMA) | 352 | 20 | 12.1 | 27.6 | 18.7 | 585 |
| Example 2 (A1 + 25 wt % EVA) | 345 | 26.1 | 12.3 | 22.6 | 25.6 | 845 |
| Example 3 (A2 + 25 wt % EBA) | 176 | 26.3 | 10.3 | 24.6 | 26.3 | 633 |
| Example 4 (A1 + 15 wt % EBA) | 454 | 21.7 | 14.1 | 22.8 | 21.6 | 559 |
| Example 5 (A1 + 25 wt % EBA) | 432 | 20.7 | 12.7 | 30.7 | 19.4 | 563 |
| Example 6 (A1 + 30 wt % EBA) | 292 | | | | | |
| Example 7 (A1 + 50 wt % EBA) | 124 | | | | | |
| Comparative Example 1 (A1) | 508 | | 16.8 | 16.6 | 25.7 | 484 |
| Comparative Example 2 (A2) | 289 | 26.3 | 13.2 | 30.1 | 26.3 | 552 |
| Comparative Example 3 (A1 + 5 wt % EBA) | 489 | | | | | |

As can been seen from the table, the compositions according to the present invention show good mechanical properties with low or no stress whitening under impact and further without cracking formation at low temperature in comparison to pure polypropylene compositions or polypropylene compositions, which do not comprises a sufficient amount of polar ethylene polymers.

The invention claimed is:

1. An insulation layer for cables consisting of a polypropylene composition consisting of
   a. a polypropylene base resin (A), which comprises a heterophasic propylene copolymer consisting of
      i. an isotactic propylene homo- and/or copolymer as matrix phase having a comonomer content of 0.5 to 10 wt %, based on the total amount of propylene matrix phase, and
      ii. a propylene copolymer as dispersed phase having a comonomer content of 20 to 80 wt %, based on the total amount of dispersed phase,
      in an amount of 50 to 90 wt % based on the total polypropylene composition; and
   b. a polar ethylene polymer (B), in amount of 10 to 50 wt %, based on the total polypropylene composition;
   wherein the polar ethylene polymer (B) comprises polar comonomers of C1- to C6-alkyl acrylates, C1- to C6-alkyl methacrylates, acrylic acids, methacrylic acids, or a mixture thereof.

2. Insulation layer for cables according to claim 1, wherein the propylene copolymer (ii) of the heterophasic propylene copolymer is dispersed in the polypropylene matrix phase; and wherein the propylene copolymer (ii) has an average particle size of less than 1 micrometer.

3. Insulation layer for cables according to claim 1 wherein the amount of propylene copolymer (ii) in the heterophasic propylene copolymer is from 10 to 50 wt. % of the heterophasic propylene copolymer.

4. Insulation layer for cables according to claim 1 wherein the comonomer content of polar ethylene copolymer (B) is from 2 to 40 wt %, based on the total polar ethylene copolymer (B).

5. Insulation layer for cables according to claim 1 wherein the polypropylene composition has a stress whitening intensity of equal to or less than 3 in a three point bending test.

6. Insulation layer for cables according to claim 1 wherein the polypropylene composition has a stress whitening intensity of equal to or less than 3 at a temperature of −40° C. in a cold bend test.

7. Insulation layer for cables according to claim 1 wherein the polypropylene composition shows no crack formation at a temperature of −40° C. in a cold bend test.

8. Insulation layer for cables according to claim 1 wherein the polypropylene composition has a tensile modulus below 1000 MPa.

9. Insulation layer for cables according to claim 1 wherein the polypropylene composition has a strain yield of above 20%.

10. Insulation layer for cables according to claim 1 wherein the polypropylene composition has a maximal peak melting temperature of above 135° C.

11. A process for producing an insulation layer for a cable wherein a polypropylene composition consisting of
    a. a polypropylene base resin (A), which comprises a heterophasic propylene copolymer consisting of
       i. an isotactic propylene homo- and/or copolymer as matrix phase having a comonomer content of 0.5 to 10 wt %, based on the total amount of propylene matrix phase, and
       ii. a propylene copolymer as dispersed phase having a comonomer content of 20 to 80 wt %, based on the total amount of dispersed phase,
       in an amount of 50 to 90 wt % based on the total polypropylene composition; and
    b. a polar ethylene polymer (B), in amount of 10 to 50 wt %, based on the total polypropylene composition,
    is formed into the insulation layer of said cable;
    wherein the polar ethylene polymer (B) comprises polar comonomers of C1- to C6-alkyl acrylates, C1- to C6-alkyl methacrylates, acrylic acids, methacrylic acids, or a mixture thereof.

12. A method for producing a cable, comprising extruding a polypropylene composition onto a conductor to form the insulation layer according to claim 1.

13. A cable comprising an insulation layer according to claim 1.

* * * * *